United States Patent [19]

Dalby

[11] Patent Number: 4,580,748
[45] Date of Patent: Apr. 8, 1986

[54] EARTH ORBITING SATELLITE WITH IMPROVED PASSIVE THERMAL RADIATOR

[75] Inventor: James F. Dalby, Reston, Va.

[73] Assignee: Satellite Business Systems, McLean, Va.

[21] Appl. No.: 556,750

[22] Filed: Nov. 30, 1983

[51] Int. Cl.[4] .............................................. B64G 1/50
[52] U.S. Cl. .......................... 244/158 R; 244/158 A; 244/163; 165/903
[58] Field of Search ...................... 244/158 R, 163, 57, 244/158 A; 62/467 R, DIG. 1; 165/DIG. 5

[56] References Cited

U.S. PATENT DOCUMENTS

| | | | |
|---|---|---|---|
| 2,234,122 | 3/1941 | Heck | 62/DIG. 1 |
| 3,310,102 | 3/1967 | Trombe | 62/467 R |
| 3,422,886 | 1/1969 | Baller | 62/467 R |
| 3,489,203 | 1/1970 | Fischell | 244/163 |
| 4,162,701 | 7/1979 | Ollendorf | 244/163 |
| 4,423,605 | 1/1984 | Petrick et al. | 62/467 R |

FOREIGN PATENT DOCUMENTS 1125958  3/1962  Fed. Rep. of Germany ... 62/DIG. 1

Primary Examiner—Galen L. Barefoot
Assistant Examiner—Rodney Corl
Attorney, Agent, or Firm—Pollock, Vande Sande and Priddy

[57] ABSTRACT

An earth orbiting satellite (10) having a despun interior portion (22) supporting heat generating elements (24) and a spinning exterior portion (12) having a thermal radiator (20) for heat radiated by these elements, is provided with reflectors (42, 44) in the annulus (40) between the spinning and despun portions, the reflectors being configured to reflect radiation from the annulus to the thermal radiator. See FIG. 2.

4 Claims, 6 Drawing Figures

U.S. Patent
Apr. 8, 1986
4,580,748
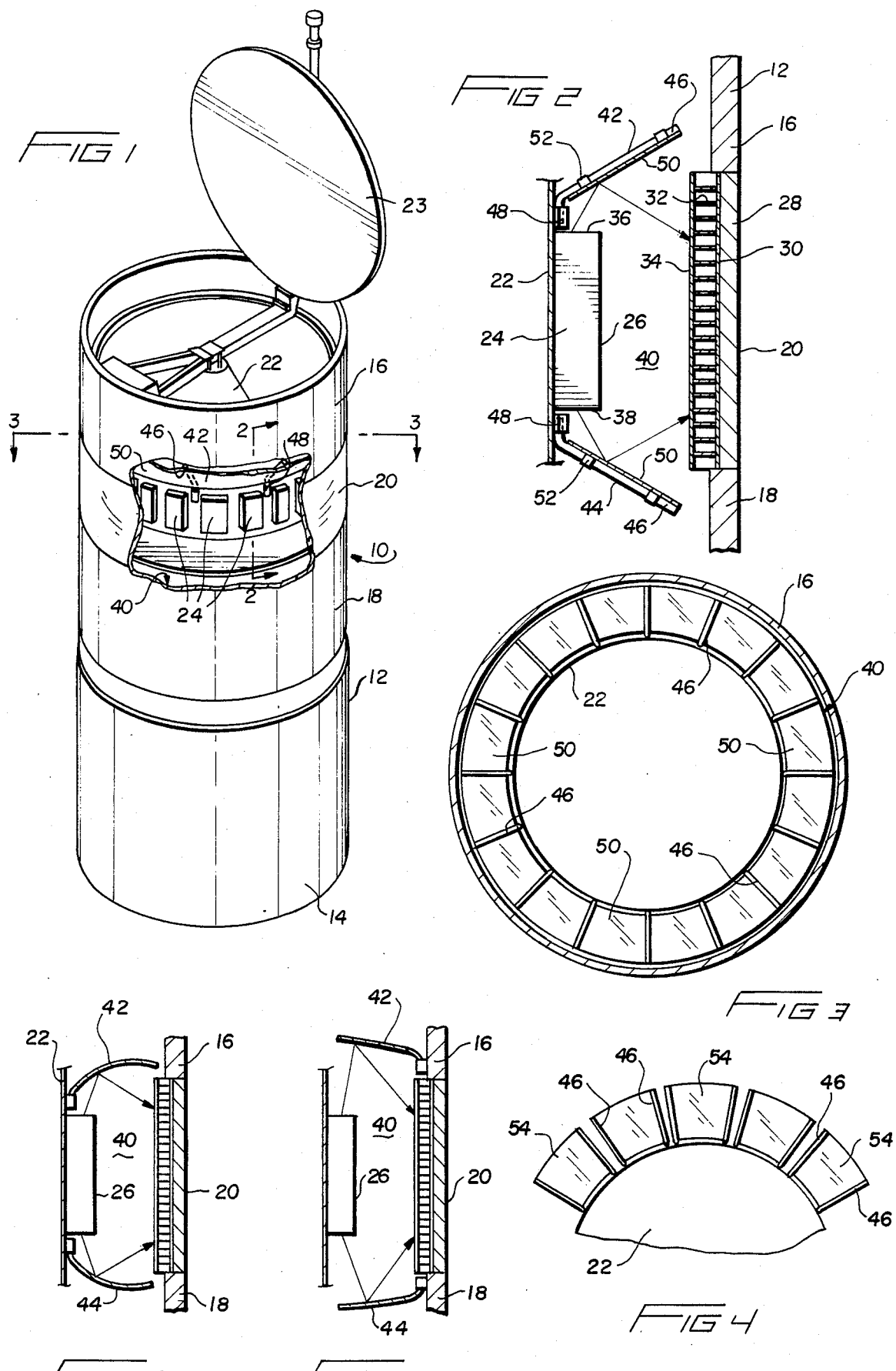

EARTH ORBITING SATELLITE WITH IMPROVED PASSIVE THERMAL RADIATOR

TECHNICAL FIELD

The present invention concerns earth orbiting satellites of the type which receive transmissions from earth stations and rebroadcast them to other earth stations, or detect emanations of various sorts from the solar system and relay information regarding such emanations to earth stations, and the like. More particularly, the invention concerns an improved means for rejecting from such a satellite heat which is generated during operation of its electronic components.

BACKGROUND ART

Although earth orbiting communication satellites have been in use for a number of years, the problem of providing adequate cooling for the vital and thermally sensitive electronic components of such satellites has continued to plague designers. Heat resulting from solar radiation can be reflected away from the satellite by providing those portions of its exterior not covered with solar cells and other equipment such as antennas with a suitable reflecting surface. However, the electronics carried within the satellite generate their own heat which somehow must be rejected from the satellite in order to maintain the temperatures of the electronics within safe operational limits and thereby to prolong their life.

One known technique for removing heat from such a satellite is to position the relatively hot electronics elements in packages or compartments located near the periphery of the satellite and to locate a mirror radiator outboard of the electronics to absorb heat radiated by the electronics and re-radiate this heat to the environment of the satellite. One such prior art mirror radiator comprises an exterior layer of quartz which is silvered on the interior side and backed by an aluminum honeycomb which is blackened on its interior side. Such a mirror radiator absorbs heat from its interior side and re-radiates it to the environment of the satellite but also tends to reflect heat reaching the satellite from its environment.

Unfortunately, the thermal absorptance, reflectance and transmittance of the mirror radiator change irreversibly with time so that over the life of the satellite, less and less of the heat generated by the satellite electronics can be rejected through such a mirror radiator. In addition, such a mirror radiator can re-radiate only heat which flows to it radially from the electronics of the satellite. This means, in effect, that most heat radiated axially by the electronics misses the mirror reflector and is absorbed by the interior structure of the satellite. Although such axially radiated heat could, to some extent, be captured by a mirror radiator which is considerably longer than the electronics compartments, such a solution is not optimum since it would result in a loss of satellite surface for photocells, would be expensive due to the high cost of such mirror radiators and would result in a more bulky structure. A need has existed over a number of years for a simple, effective means for absorbing and re-radiating such axially radiated heat without requiring the use of greatly enlarged mirror radiators.

DISCLOSURE OF THE INVENTION

The object of the present invention is to provide an improved means for radiating heat from the interior of a communications satellite.

Another object of the invention is to provide such a means which is simple, inexpensive and compact.

Still another object of the invention is to provide such an improvement which does not require significant modification of existing satellite structures.

A still further object of the invention is to provide such an improvement which can be used with satellites having spinning and despun portions and which can be readily adapted for attachment to either the spinning or despun portion of the satellite.

These objects of the invention are given only by way of example; therefore, other desirable objectives and advantages inherently achieved by the disclosed invention may occur or become apparent to those skilled in the art. Nonetheless, the scope of the present invention is to be limited only by the appended claims.

The invention is particularly suited for use in earth orbiting satellites of the type which include an exterior housing having a spin axis and a thermal radiator panel extending at least partially around the housing. Within the housing, an interior portion is supported by but despun relative to the exterior housing. A plurality of heat-generating elements, such as compartments or enclosures for the electronics of the satellite, are positioned on this despun interior portion at locations radially opposite and inward from the thermal radiator panel. Such heat generating elements are configured to radiate heat both radially toward the radiator panel and axially into the annulus defined between the heat generating elements and the exterior housing.

According to the invention, reflector means are provided which extend into this annulus at least at one location spaced axially from the heat-generating elements, in position to reflect toward the thermal radiator panel heat which is radiated axially into the annulus from the heat-generating elements. Such reflector means can be placed forward or aft of the heat-generating elements or at both ends thereof. In the preferred embodiment, the reflector means comprises a plurality of strut elements supported by the despun interior portion and extended radially into the annulus between the interior portion and the exterior housing. A reflector, such as an annulus of aluminized plastic film, is supported on the strut elements. To facilitate installation of the reflector and to permit adjustment of its geometry as necessary to reflect heat to the radiator panel, the strut elements preferably are flexible.

Although a full annulus of aluminized plastic film is preferred for the reflector, it is also within the scope of the invention to provide a plurality of segments of such an annulus, each of the segments being supported by at least two strut elements. In the preferred embodiment, the struts are attached to the interior, despun portion of the satellite; however, it is also within the scope of the invention to mount the struts and the annular or segmented reflector on the exterior, spinning portion of the satellite. In either event, the rejection of heat from the satellite electronics is calculated to increase significantly, leading to longer operating lifetimes.

BRIEF DESCRIPTION OF THE DRAWING

FIG. 1 shows a perspective view, partially broken away, of an earth orbiting satellite of the type particularly suited for modification in accordance with the present invention.

FIG. 2 shows a view taken along line 2—2 of FIG. 1 illustrating the structure and position of a thermal reflector according to the invention.

FIG. 3 shows a view taken along line 3—3 of FIG. 1 illustrating a top view of a reflector according to the invention.

FIG. 4 shows a fragmentary view, similar to that of FIG. 3, of an alternative embodiment of the invention in which the reflector is segmented.

FIG. 5 shows a view, similar to that of FIG. 2, in which the reflector is curved rather than planar.

FIG. 6 shows a view, similar to that of FIGS. 2 and 5, in which the reflector is mounted on the exterior, spinning portion of the satellite.

BEST MODE FOR CARRYING OUT THE INVENTION

The invention will be described with reference to the drawing in which like reference numerals identify like elements of structure in each of the several Figures.

FIG. 1 illustrates schematically an earth orbiting satellite 10 of a type particularly suited for modification in accordance with the present invention. The satellite is shown in its deployed configuration as it would appear in orbit. An exterior housing member 12 surrounds most of the components of the satellite and, in the now familiar manner, spins about the longitudinal axis of the satellite following deployment. Housing 12 comprises an aft, cylindrical solar panel 14 and a pair of forward, cylindrical solar panels 16, 18. Between panels 16, 18, a primary, cylindrical thermal radiator panel 20 is provided through which heat generated within the satellite is radiated to its environment.

Within housing 10 are located, among other things, a propulsion unit (not illustrated) which spins with the housing and is supported by it, plus a despun (that is, not spinning) payload compartment or interior portion 22. This despun portion is supported by but does not rotate with housing 12 so that an antenna reflector 23 supported by the despun portion can be maintained in a relatively constant orientation relative to a transmitting and receiving station located on the earth. A suitable arrangement for mounting such an antenna reflector is disclosed in my U.S. Pat. No. 4,465,951 issued Aug. 14, 1984, for Backup Bearing and Power Transfer Assembly for Communication Satellite.

Despun interior portion 22 supports on its circumference a plurality of heat-generating elements 24 such as electronic modules whose heat must be led away from the interior of the satellite to prevent overheating. For example, elements 24 may comprise travelling wave tube amplifiers and electrical power conditioners. The heat-generating elements 24 are positioned opposite thermal radiator panel 20 so that heat radiated from them in a generally radial direction will be transmitted from the satellite through thermal radiator panel 20.

As shown in the sectional view of FIG. 2, the radially outermost face 26 of each heat generating element 24 is positioned directly opposite thermal radiator panel 20 in the manner previously described. In a typical application, radiator panel 20 may comprise an exterior layer 28 of quartz having a reflective inner layer 30 of silver. Contacting layer 30 is an aluminum honeycomb 32 which includes on its innermost surface a blackened rear panel 34. As a result of this configuration, solar radiation from the environment of the satellite is reflected away at surface 30. On the other hand, radiation from face 26 of each heat generating element 24 is absorbed at panel 34, conducted through honeycomb 32 and reflective layer 30 and radiated through layer 28 to the environment of the satellite.

Although radiation leaving face 26 of each heat generating element 24 is relatively effectively removed from the interior of the satellite in the manner just described, radiation from the forward and aft faces 36, 38 of heat-generating elements 24 passes, instead, into an annulus 40 formed between the spinning exterior housing member 12 and despun interior portion 22, a location from which its escape would be difficult were it not for the improvement according to the present invention. Particularly, forward and aft reflector means 42, 44 are provided which extend into annulus 40 from locations spaced axially forward and aft of faces 36, 38 as shown in FIGS. 2, 5 and 6. As a result, radiation leaving forward and aft faces 36, 38 is reflected from annulus 40 toward thermal radiator panel 20 through which it is re-radiated to the environment. Although it is preferred to provide reflector means both forward and aft of the heat generating elements 24, single reflector means may be provided at one end or the other should space limitations so require, an arrangement which also will reduce the amount of heat retained within the satellite.

As shown in FIGS. 2 to 6, each of reflector means 42, 44 comprises a plurality of circumferentially spaced, radially extended and flexible strut elements 46 which protrude into annulus 40 and are supported at one end by a simple bracket 48. Approximately a 30° spacing between struts is preferred. Metal rods of 0.0625 inch (0.159 cm) diameter are suitable for struts 46. In the preferred embodiment of the invention, the plurality of struts supports an annular reflector 50 which is attached to the struts by means of suitable fasteners 52 such as clips, integral loops and the like. Preferably, annular reflector 50 is made from a material such as aluminized mylar film cut into the annular configuration illustrated in FIG. 3. The thickness of such films is on the order of 0.001 inch (0.00254 cm). However, it is also within the scope of the invention to form reflector means 42, 44 from a plurality of annular segments 54 at least one of which is supported forward and/or aft of each heat generating element 24 as illustrated in FIG. 4. At least a pair of struts 46 should be used to support each such annular segment 54.

Annular reflector 50 may be formed more or less as a flat-faced segment of a cone, as illustrated in FIGS. 2 and 3. However, since struts 46 are flexible, it is also within the scope of the invention to bend the struts to a curved configuration as illustrated in FIG. 5. For example, when the heat generating elements are approximately 4.0 inches (10.16 cm) in radial width and 14.0 inches (35.56 cm) in axial height, surface 26 is approximately 6 inches (15.24 cm) from panel 34, and panel 34 extends 3 inches (7.62 cm) from forward face 36, then an annular, conical reflector means preferably should have an overall width of 7.5 inches (19.05 cm) and should extend at an angle of 30° above or below the horizontal as illustrated in FIG. 2. The portions of reflectors 50 directly forward or aft of hot faces 36, 38 should have a diffuse finish so that faces 36, 38 do not "see" images of themselves. Preferably, a curved reflector means is used as illustrated in FIG. 5, in order that the hot faces 36, 38 will have an optimum view of the cool surfaces of panel 34. In this case, for heat-generating elements of the size previously mentioned, the curve should conform at least approximately to the following mathematical relationship, assuming an origin at each bracket 48:

$$y = (1.78x)^{0.5},$$

where y is the axial direction and x is the radial direction.

Although it is preferred that reflector means 42, 44 be mounted on interior portions 22 in the manner shown in FIGS. 1 to 5, it is also within the scope of the invention to mount the reflector means on exterior housing 12 just forward and aft of thermal radiator panel 20, in the manner illustrated in FIG. 6.

Having described my invention in sufficient detail to enable those skilled in the art to make and use it, I claim:

1. In an earth-orbiting satellite of the type including an exterior housing having a spin axis and a thermal radiator panel extending at least partially therearound, an interior portion supported by but despun relative to said exterior housing, a plurality of heat generating elements positioned on said interior portion at locations radially opposite to said thermal radiator panel, said heat generating elements being spaced radially inwardly from said thermal radiator panel and being configured to radiate heat both radially toward said panel and axially into the annulus defined between said interior portion and said exterior housing, the improvement comprising:

reflector means, extended into said annulus at least at one location spaced axially from said heat generating elements, for reflecting toward said thermal radiator panel heat radiated axially into said annulus from said heat generating elements, said reflector means comprising a plurality of strut elements supported by said interior portion and extended radially into said annulus, and a reflector supported by said strut elements, said strut elements being flexible to permit adjustment of the geometry of said reflector, said reflector comprising an annulus of metallized plastic film shaped to reflect heat toward said radiator panel.

2. In an earth-orbiting satellite of the type including an exterior housing having a spin axis and a thermal radiator panel extending at least partially therearound, an interior portion supported by but despun relative to said exterior housing, a plurality of heat generating elements positioned on said interior portion at locations radially opposite to said thermal radiator panel, said heat generating elements being spaced radially inwardly from said thermal radiator panel and being configured to radiate heat both radially toward said panel and axially into the annulus defined between said interior portion and said exterior housing, the improvement comprising:

reflector means, extended into said annulus at least at one location spaced axially from said heat generating elements, for reflecting toward said thermal radiator panel heat radiated axially into said annulus from said heat generating elements, said reflector means comprising a plurality of strut elements supported by said exterior housing and extended radially into said annulus, and a reflector supported by said strut elements, said strut elements being flexible to permit adjustment of the geometry of said reflector, said reflector comprising an annulus of metallized plastic film shaped to reflect heat toward said radiator panel.

3. In an earth-orbiting satellite of the type including an exterior housing having a spin axis and a thermal radiator panel extending at least partially therearound, an interior portion supported by but despun relative to said exterior housing, a plurality of heat generating elements positioned on said interior portion at locations radially opposite to said thermal radiator panel, said heat generating elements being spaced radially inwardly from said thermal radiator panel and being configured to radiate heat both radially toward said panel and axially into the annulus defined between said interior portion and said exterior housing, the improvement comprising:

reflector means, extended into said annulus at least at one location spaced axially from said heat generating elements, for reflecting toward said thermal radiator panel heat radiated axially into said annulus from said heat generating elements, said reflector means comprising a plurality of strut elements supported by said interior portion and extended radially into said annulus, and a reflector supported by said strut elements, said reflector comprising a plurality of segments of an annulus of metallized plastic film, each of said segments being supported by at least two of said strut elements, said reflector being shaped to reflect heat toward said radiator panel, said strut elements being flexible to permit adjustment of the geometry of said reflector.

4. In an earth-orbiting satellite of the type including an exterior housing having a spin axis and a thermal radiator panel extending at least partially therearound, an interior portion supported by but despun relative to said exterior housing, a plurality of heat generating elements positioned on said interior portion at locations radially opposite to said thermal radiator panel, said heat generating elements being spaced radially inwardly from said thermal radiator panel and being configured to radiate heat both radially toward said panel and axially into the annulus defined between said interior portion and said exterior housing, the improvement comprising:

reflector means, extended into said annulus at least at one location spaced axially from said heat generating elements, for reflecting toward said thermal radiator panel heat radiated axially into said annulus from said heat generating elements, said reflector means comprising a plurality of strut elements supported by said exterior housing and extended radially into said annulus, and a reflector supported by said strut elements, said reflector comprising a plurality of segments of an annulus of metallized plastic film, each of said segments being supported by at least two of said strut elements, said reflector being shaped to reflect heat toward said radiator panel, said strut elements being flexible to permit adjustment of the geometry of said reflector.

* * * * *